May 6, 1958 R. P. MORK 2,834,011

BINARY CYCLICAL ENCODER

Filed Sept. 29, 1954 2 Sheets-Sheet 1

INVENTOR
RAYMOND P. MORK
BY Elmer J. Gorn
ATTORNEY

May 6, 1958 R. P. MORK 2,834,011

BINARY CYCLICAL ENCODER

Filed Sept. 29, 1954 2 Sheets-Sheet 2

INVENTOR
RAYMOND P. MORK
BY
ATTORNEY 2,834,011
Patented May 6, 1958

2,834,011

BINARY CYCLICAL ENCODER

Raymond P. Mork, Needham Heights, Mass., assignor to Raytheon Manufacturing Company, Waltham, Mass., a corporation of Delaware Application September 29, 1954, Serial No. 459,066
8 Claims. (Cl. 340—347)

Figure 1:
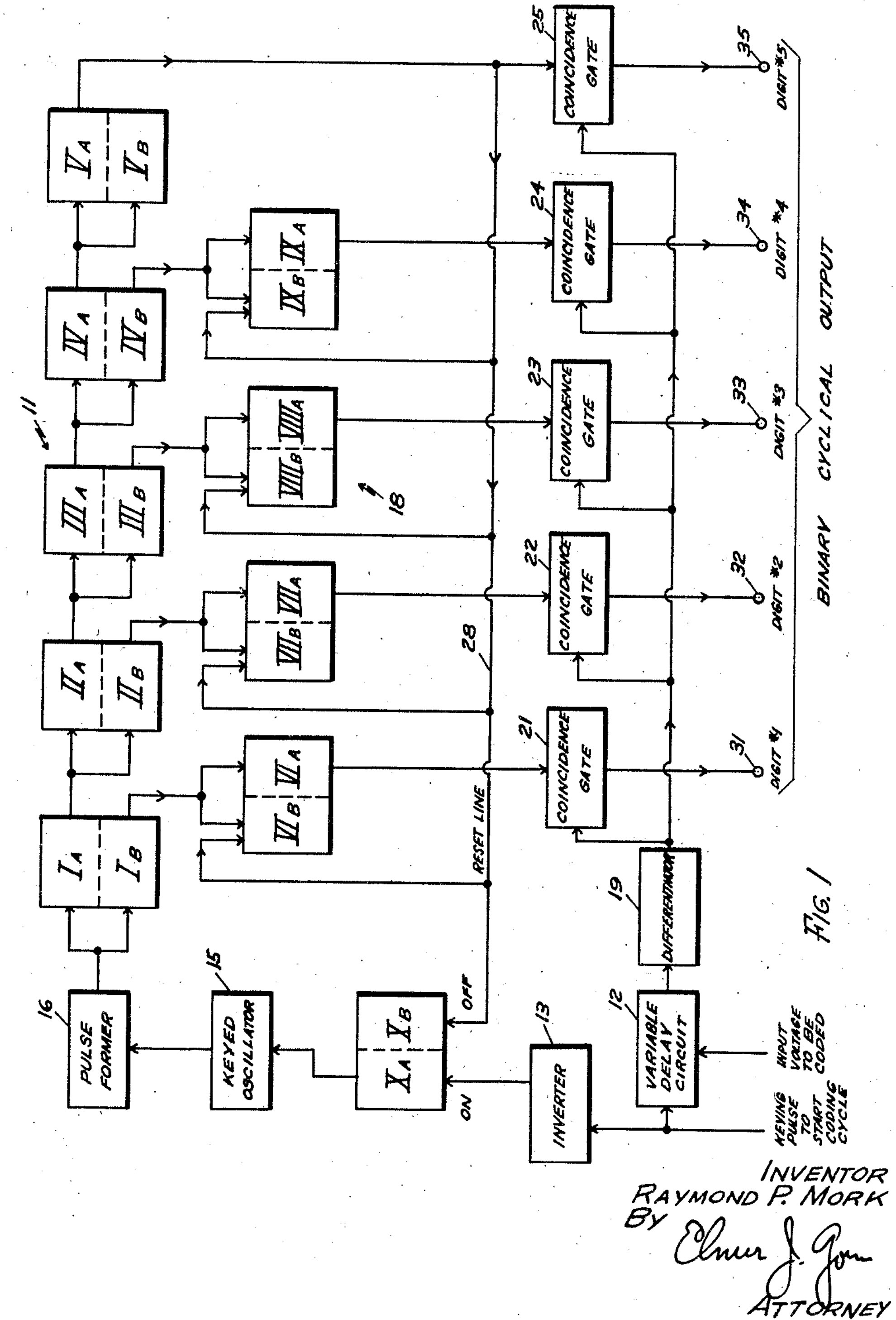

This invention relates to an electronic counter and, more particularly, to a device for converting signal intelligence into a binary digital code whose successive values or levels differ by a single digit.

The form of code now generally in use is the binary binomial code, referred to herein also as the conventional binary code. The use of this code requires that any data (voltage, shaft position, etc.) to be coded must first be quantized, that is, any data sample lying between two coded values or levels must be adjusted at the instant of coding to the nearest exact code value. This quantizing prevents any attempt to select a code halfway between two code values, which would result in erratic selection of digits and large errors, particularly when higher order digits are changing between two code intervals. The design of circuits or other means to provide quantizing frequently is the most difficult problem in coder design and either complex circuits having a high degree of stability or awkward mechanical devices are usually required.

The need of quantizing can be eliminated by employing a different type of binary code, referred to herein as the binary cyclical code. The characteristic feature of this binary cyclical code is that, in going from one code value or level to the next, only one digit changes. An attempt to select a code value corresponding to input information lying between two code values cannot cause an error of more than half the difference between the two code values, since erratic selection of a single changing digit can result only in selection of either the next higher or the next lower code of value. This small error is inherent in any digital coding system.

In accordance with the subject invention, a binary cyclical code is derived electronically by means of a device including a counter chain which provides the conventional binary code above referred to. A keying pulse at the beginning of each coding cycle keys an oscillator which produces a signal of a predetermined fixed frequency; this signal is formed into a series of equally spaced negative input pulses by a pulse-forming means. These negative pulses are applied to both input circuits of the first stage of said counter chain. Negative pulses derived from one of the output circuits of all but the last stage of the aforesaid counter chain are applied to the two input circuits of a corresponding stage of an array of bistable devices. An output pulse is derived for each digit of the code except the last, or highest order digit, from a corresponding stage of the aforesaid array and an output pulse from the last stage of the counter chain is derived for the last digit of the code, thereby providing a binary cyclical count of the number of input pulses. This count may be read out at an instant of time dependent upon an input information signal by means of coincidence gates receptive of said output pulses and opened by read pulses generated in accordance with the value of said information signal.

Figure 2:
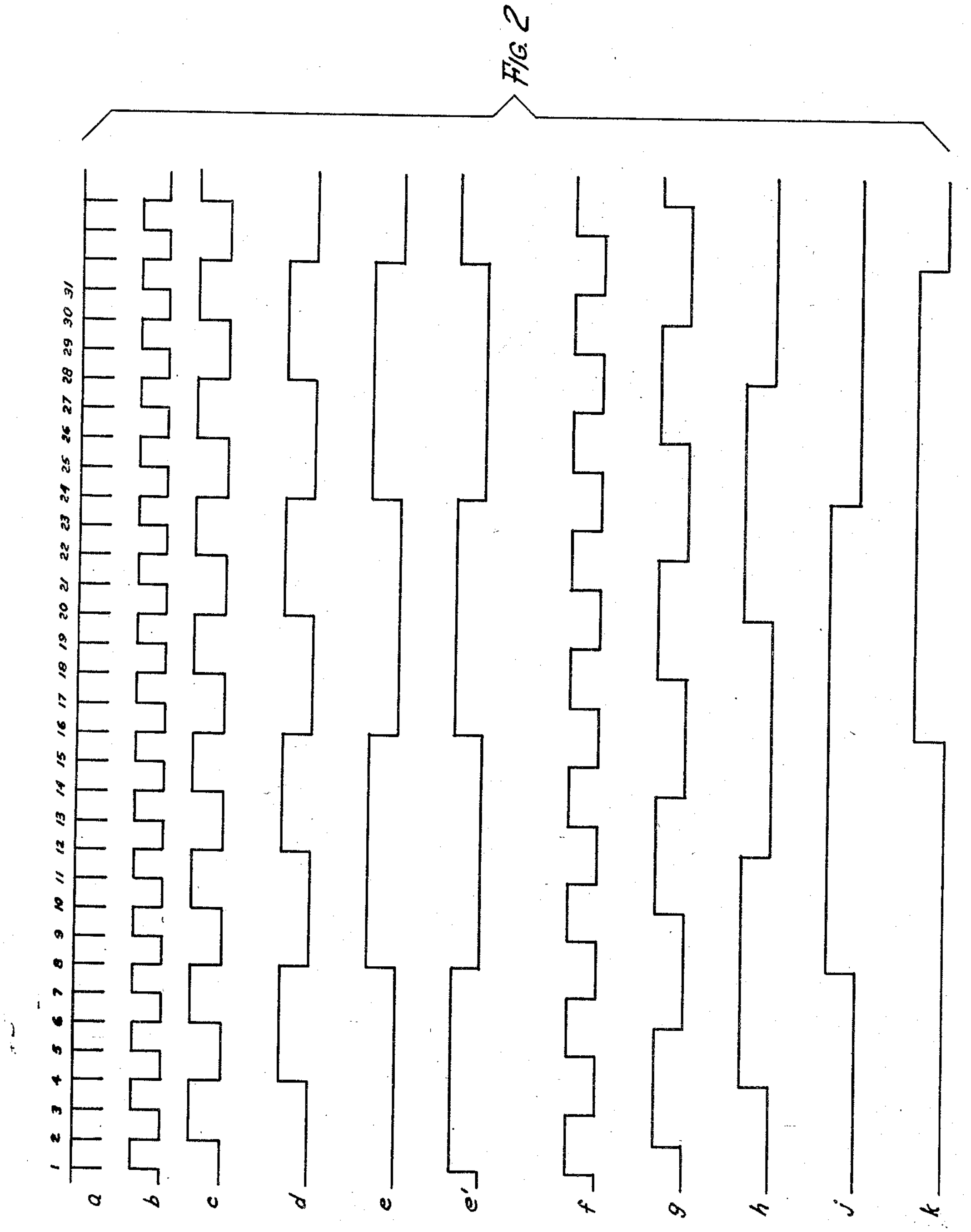

In the drawings:

Fig. 1 is a block diagram of an embodiment of the invention for converting signal intelligence into a binary cyclical code; and Fig. 2 represents plate wave forms illustrative of the operation of the device of Fig. 1.

Referring to Fig. 1, a plurality of bistable stages I, II, III, IV and V are interconnected in cascade in the order named to form a conventional binary binomial counter 11. This bistable stage may, for example, be a standard bistable multivibrator consisting of two tubes having the plates and grids intercoupled and adapted to remain in one of two stable states, in each of which one tube is conducting while the other is non-conducting. Each multivibrator will remain in its existent state until switched by a suitable negative impulse. The two tubes or portions of each stage are represented by subscripts A and B, respectively. In the initial or quiescent state, that is, in the absence of any trigger-impulses, the portions of the stages shown by subscripts A are conductive, while those shown by subscript B are non-conductive.

At the beginning of each coding cycle, a positive keying pulse is derived from a source external of the coding device of the subject invention. This keying pulse is applied directly to a variable delay circuit 12, to be described in detail later, and, after inversion by inverter 13, is applied as a negative keying pulse to one input of a bistable multivibrator X, which serves as an "on-off" control for oscillator 15. As shown in Fig. 1, the keying pulse is applied to the "on" side $X_A$ of multivibrator X, which is conducting in the quiescent state. In response to the negative keying pulses, an output is derived from the pulse $X_A$ of "on-off" multivibrator X. The output from portion $X_A$ is supplied to the keyed oscillator 15 which, in response thereto, generates a signal of fixed frequency as, for example, a sinusoidal wave form from a sine wave generator or a square wave form from a multivibrator or the like. The frequency of oscillator 15 will depend somewhat upon the counting rate. For example, if it is desired to use a code having 32 cycles within a 20 microsecond interval or intelligence period, a counting frequency of $$\frac{32}{20\times 10^{-6}}$$

or 1.6 megacycles would be required. The frequency will also be dependent upon the parameters of the variable delay circuit, in a manner to be described subsequently. The fixed frequency signal from keyed oscillator 15 is formed into trigger pulses, shown in Fig. 2*a*, by a suitable pulse forming means 16.

The negative trigger pulses of Fig. 2*a* to be counted are fed to both input circuits of multivibrator stage I, causing it to reverse its stage with each pulse. Every other input pulse causes stage I to return to its normal state, thereby producing a negative pulse in the output circuit of portion $I_A$ of stage I, which is coupled, in turn, to both input circuits $II_A$ and $II_B$ of stage II. Connections are made similarly from the output circuit of portion $II_A$ of stage II to both input circuits $III_A$ and $III_B$ of stage III, and so forth, so that stages I, II, III, IV and V compose a counter chain 11 of the usual binary binomial type. The stage would be utilized directly. Furthermore, the output from the normally non-conductive portion $V_B$ of stage V would be connected to both inputs of the added stage in array 18. Similarly, two stages in addition to those shown in Fig. 1 would be necessary in both counter chain 11 and array 18 if a 128 cycle code is required, etc.

The operating cycle of the coder of Fig. 1 is indicated by the following Table I:

*Table I*

| Trigger Impulse from Pulse Former 16 | Stages | | | | | | | | | | | | | | | | | | |
|---|---|---|---|---|---|---|---|---|---|---|---|---|---|---|---|---|---|---|---|
| | I | | II | | III | | IV | | V | | VI | | VII | | VIII | | IX | | X |
| | A | B | A | B | A | B | A | B | A | B | A | B | A | B | A | B | A | B | A |
| 0 | X | 0 | X | 0 | X | 0 | X | 0 | X | 0 | X | 0 | X | 0 | X | 0 | X | 0 | X |
| 1 | 0 | X | X | 0 | X | 0 | X | 0 | X | 0 | 0 | X | X | 0 | X | 0 | X | 0 | X |
| 2 | X | 0 | 0 | X | X | 0 | X | 0 | X | 0 | 0 | X | 0 | X | X | 0 | X | 0 | X |
| 3 | 0 | X | 0 | X | X | 0 | X | 0 | X | 0 | X | 0 | 0 | X | X | 0 | X | 0 | X |
| 4 | X | 0 | X | 0 | 0 | X | X | 0 | X | 0 | X | 0 | 0 | X | 0 | X | X | 0 | X |
| 5 | 0 | X | X | 0 | 0 | X | X | 0 | X | 0 | 0 | X | 0 | X | 0 | X | X | 0 | X |
| 6 | X | 0 | 0 | X | 0 | X | X | 0 | X | 0 | 0 | X | X | 0 | 0 | X | X | 0 | X |
| 7 | 0 | X | 0 | X | 0 | X | X | 0 | X | 0 | X | 0 | X | 0 | 0 | X | X | 0 | X |
| 8 | X | 0 | X | 0 | X | 0 | 0 | X | X | 0 | X | 0 | X | 0 | 0 | X | 0 | X | X |
| 9 | 0 | X | X | 0 | X | 0 | 0 | X | X | 0 | 0 | X | X | 0 | 0 | X | 0 | X | X |
| 10 | X | 0 | 0 | X | X | 0 | 0 | X | X | 0 | 0 | X | 0 | X | 0 | X | 0 | X | X |
| 11 | 0 | X | 0 | X | X | 0 | 0 | X | X | 0 | X | 0 | 0 | X | 0 | X | 0 | X | X |
| 12 | X | 0 | X | 0 | 0 | X | 0 | X | X | 0 | X | 0 | 0 | X | X | 0 | 0 | X | X |
| 13 | 0 | X | X | 0 | 0 | X | 0 | X | X | 0 | 0 | X | 0 | X | X | 0 | 0 | X | X |
| 14 | X | 0 | 0 | X | 0 | X | 0 | X | X | 0 | 0 | X | X | 0 | X | 0 | 0 | X | X |
| 15 | 0 | X | 0 | X | 0 | X | 0 | X | X | 0 | X | 0 | X | 0 | X | 0 | 0 | X | X |
| 16 | X | 0 | X | 0 | X | 0 | X | 0 | 0 | X | X | 0 | X | 0 | X | 0 | 0 | X | 0 |
| 17 | 0 | X | X | 0 | X | 0 | X | 0 | 0 | X | 0 | X | X | 0 | X | 0 | 0 | X | 0 |
| 18 | X | 0 | 0 | X | X | 0 | X | 0 | 0 | X | 0 | X | 0 | X | X | 0 | 0 | X | 0 |
| 19 | 0 | X | 0 | X | X | 0 | X | 0 | 0 | X | X | 0 | 0 | X | X | 0 | 0 | X | 0 |
| 20 | X | 0 | X | 0 | 0 | X | X | 0 | 0 | X | X | 0 | 0 | X | 0 | X | 0 | X | 0 |
| 21 | 0 | X | X | 0 | 0 | X | X | 0 | 0 | X | 0 | X | 0 | X | 0 | X | 0 | X | 0 |
| 22 | X | 0 | 0 | X | 0 | X | X | 0 | 0 | X | 0 | X | X | 0 | 0 | X | 0 | X | 0 |
| 23 | 0 | X | 0 | X | 0 | X | X | 0 | 0 | X | X | 0 | X | 0 | 0 | X | 0 | X | 0 |
| 24 | X | 0 | X | 0 | X | 0 | 0 | X | 0 | X | X | 0 | X | 0 | 0 | X | X | 0 | 0 |
| 25 | 0 | X | X | 0 | X | 0 | 0 | X | 0 | X | 0 | X | X | 0 | 0 | X | X | 0 | 0 |
| 26 | X | 0 | 0 | X | X | 0 | 0 | X | 0 | X | 0 | X | 0 | X | 0 | X | X | 0 | 0 |
| 27 | 0 | X | 0 | X | X | 0 | 0 | X | 0 | X | X | 0 | 0 | X | 0 | X | X | 0 | 0 |
| 28 | X | 0 | X | 0 | 0 | X | 0 | X | 0 | X | X | 0 | 0 | X | X | 0 | X | 0 | 0 |
| 29 | 0 | X | X | 0 | 0 | X | 0 | X | 0 | X | 0 | X | 0 | X | X | 0 | X | 0 | 0 |
| 30 | X | 0 | 0 | X | 0 | X | 0 | X | 0 | X | 0 | X | X | 0 | X | 0 | X | 0 | 0 |
| 31 | 0 | X | 0 | X | 0 | X | 0 | X | 0 | X | X | 0 | X | 0 | X | 0 | X | 0 | 0 |
| 32 | X | 0 | X | 0 | X | 0 | X | 0 | X | 0 | X | 0 | X | 0 | X | 0 | X | 0 | X |

X=Conductive in quiescent condition.
0=Non-conductive in quiescent condition.

output wave forms derived from the output circuit of normally conducting halves of stages I, II, III, IV and V are shown by Figs. 2*b*, 2*c*, 2*d*, 2*e*, and 2*k*, respectively. Negative pulses derived from the normally non-conductive portions $I_B$, $II_B$, $III_B$ and $IV_B$ are applied to both input circuits of the respective stages VI, VII, VIII, and IX of a flip-flop array 18. The output wave forms derived from the portions $VI_B$, $VII_B$ etc. are 180° out of phase with those shown in Figs. 2*b*, 2*c*, 2*d*, and 2*e*, respectively. This relationship is evident by comparing Figs. 2*e* and 2*e'* where Fig. 2*e'* illustrates the output wave form derived from portion $IV_B$ of stage IV. Pulses 2*f*, 2*g*, 2*h* and 2*j* are derived from the respective portions $VI_A$, $VII_A$, $VIII_A$ and $IX_A$ of stages VI, VII, VIII and IX whenever these portions are rendered non-conductive by the negative pulses from the normally non-conductive stages of counter chain 11. The presence or absence of these pulses provides the first four digits of the counting arrangement. Pulses derived from the output circuit of portion $V_A$ of counter chain 11 are representative of the fifth digit of the counting arrangement and are shown in Fig. 2*k*. The pulses 2*f*, 2*g*, 2*h*, 2*j* and 2*k*, therefore, represent the five digits of the binary cyclical code.

Although a five-digit coder is shown and described heretofore, a code containing any desired number of digits may be achieved by selecting the proper number of multivibrator stages in counter chain 11 and array 18. For example, if a 64-cycle code is desired, an additional multivibrator would be included both in counter chain 11 and array 18. Specifically, the output from portion $V_A$ of stage V would be connected to both inputs of the additional stage of counter chain 11, and the outputs from the normally non-conductive portion of the additional X=Conductive in quiescent condition.
0=Non-conductive in quiescent condition.

It will be noted from Table I that for a 16-cycle coder—in which stage V would be omitted—the output from portion $IV_A$ of the final stage (for a 16-cycle coder) IV is identical to the output from portion $IX_A$ of stage IX for the numbers 0 through 15. Stage IX of array 18, therefore, is redundant and may be eliminated. Similarly, it may be shown from Table I that the outputs from portion $III_A$ of stage III and the output of portion $VIII_A$ of stage XIII are identical from 0 through 8 so that the stage VIII is superfluous for an 8-cycle coder. By analogy it may be concluded that there is no need for a fifth stage in array 18 to which the output of portion $V_B$ of stage V of the 32-cycle coder of Fig. 1 is connected. In other words, there may always be one less stage in array 18 than in counter chain 11 and the output from the normally conducting portion of the last stage of the counter chain may be used directly for the highest order digit.

The keying pulse used to initiate the trigger generating circuit is also applied—although in opposite polarity—to a variable delay circuit 12 which may consist of a phantastron, such as described at pages 2–58 to 2–62 of "Principles of Radar," second edition, written by members of the M. I. T. Radar School staff, and published by McGraw-Hill, or may consist of a cathode coupled multivibrator, such as described at pages 2–53 to 2–58 of the aforesaid text. The keying pulse may, for example, be applied to the common cathode in the event that a cathode-coupled multivibrator is used for variable delay circuit 12 or to the cathode or suppressor grid in the case of a phantastron. This positive keying pulse in either case conditions variable delay circuit 12 for operation, that is, initiates the leading edge of the square wave derived in the output circuit thereof.

The input or control grid circuit of variable delay circuit 12 is either continuously or periodically receptive of signal intelligence in the form of a direct current input voltage to be coded. The amplitude of this input voltage is indicative of a certain code level or number. For example, an input voltage of 10 millivolts may represent the code level or number 10, a voltage of 11 millivolts the number 11, etc. Variable delay circuit 12 is characterized in that the duration of the output pulse is substantially a linear function of the magnitude of the input voltage. The trailing edge of the square wave derived from variable delay circuit 12, therefore, occurs subsequent to the keying pulse by a time which is directly proportional to the magnitude of the input voltage to be coded. This trailing edge is differentiated in differentiator 19 to produce a sharp positive reading or gating pulse which is delayed in time with respect to the keying pulse by an amount dependent upon the magnitude of said direct current input voltage to be coded. Reading or gating pulse from differentiator 19 is applied to one of the two input circuits of each of a multiple of coincidence gates 21 to 25. The other input circuit of each of coincidence gates 21 to 24 is receptive of the output wave forms 2*f*, 2*g*, 2*h*, and 2*j* from respective stages VI, VII, VIII, and IX of array 18. The second input circuit of coincidence gate 25 is receptive of the output wave form 2*k* from the final stage V of counter chain 11.

If a single input voltage corresponding to the number *n* is applied to variable delay circuit 12, a positive gating pulse will be produced and applied to coincidence gates 21 to 25 at approximately the same time that the *n*th trigger pulse is applied to multivibrator stage I. At this instant of time any positive-going pulses appearing at the output circuit of the multivibrator of array 18 pass the corresponding coincidence gates which have already been opened by the reading or gating pulse. Thus the binary cyclical code corresponding to the number *n* appears at the binary cyclical output terminals 31–35, which correspond to digits Nos. 1–5. At any instant of time, dependent upon the magnitude of the signal intelligence input voltage, a particular binary cyclical code notation may be read out, which is representative of the characteristics of said signal intelligence. Since the reading or gating pulse for a given signal input voltage to be coded should occur simultaneously with the trigger pulse corresponding to that input voltage or shortly after the trigger pulse, when allowing for delay in the counter chain 10 and array 18, the frequency of the keyed oscillator 15 and the delay time of the variable delay circuit 12 are interdependent and any change in the parameter of the oscillator must be compensated for by a change in the parameters of the delay circuit.

A reset line 28 interconnecting the output circuit of the portion $V_A$ of the last multivibrator stage V of counter chain 11 and the "off" side of "on-off" control multivibrator X serves to turn off oscillator 15 after one complete code cycle. This is accomplished by the negative-going trailing edge of the wave form of Fig. 2*k*, corresponding to a count of 31. This wave form, when applied to portion $X_B$ of multivibrator X, returns the latter to its initial state.

The wave form of Fig. 2*k* derived at the end of one complete code cycle is also applied over a reset line 28 to the input circuits of the "B" portions of all the stages of array 18, as shown in Fig. 1, thereby resetting these stages and insuring that all digits start from zero upon receipt of the next keying pulse ushering in the succeeding coding cycle.

Since the outputs of stages V to IX are derived from the normally conductive portions, a glance at Table I will indicate that the code for the numbers 0 to 31 is as shown in Table II below with the digits being numbered in the order of the digit order:

*Table II*

| No. | Digits | | | | |
|---|---|---|---|---|---|
| | #1 | #2 | #3 | #4 | #5 |
| 0 | 0 | 0 | 0 | 0 | 0 |
| 1 | 1 | 0 | 0 | 0 | 0 |
| 2 | 1 | 1 | 0 | 0 | 0 |
| 3 | 0 | 1 | 0 | 0 | 0 |
| 4 | 0 | 1 | 1 | 0 | 0 |
| 5 | 1 | 1 | 1 | 0 | 0 |
| 6 | 1 | 0 | 1 | 0 | 0 |
| 7 | 0 | 0 | 1 | 0 | 0 |
| 8 | 0 | 0 | 1 | 1 | 0 |
| 9 | 1 | 0 | 1 | 1 | 0 |
| 10 | 1 | 1 | 1 | 1 | 0 |
| 11 | 0 | 1 | 1 | 1 | 0 |
| 12 | 0 | 1 | 0 | 1 | 0 |
| 13 | 1 | 1 | 0 | 1 | 0 |
| 14 | 1 | 0 | 0 | 1 | 0 |
| 15 | 0 | 0 | 0 | 1 | 0 |
| 16 | 0 | 0 | 0 | 1 | 1 |
| 17 | 1 | 0 | 0 | 1 | 1 |
| 18 | 1 | 1 | 0 | 1 | 1 |
| 19 | 0 | 1 | 0 | 1 | 1 |
| 20 | 0 | 1 | 1 | 1 | 1 |
| 21 | 1 | 1 | 1 | 1 | 1 |
| 22 | 1 | 0 | 1 | 1 | 1 |
| 23 | 0 | 0 | 1 | 1 | 1 |
| 24 | 0 | 0 | 1 | 0 | 1 |
| 25 | 1 | 0 | 1 | 0 | 1 |
| 26 | 1 | 1 | 1 | 0 | 1 |
| 27 | 0 | 1 | 1 | 0 | 1 |
| 28 | 0 | 1 | 0 | 0 | 1 |
| 29 | 1 | 1 | 0 | 0 | 1 |
| 30 | 1 | 0 | 0 | 0 | 1 |
| 31 | 0 | 0 | 0 | 0 | 1 |

An inspection of Table II will reveal that the binary cyclical code is characterized in that successive values or levels differ by but a single digit. This is in contrast with the conventional binary code (binary binomial code) in which successive values may differ widely. In Table III a portion of the usual binary binomial code is shown. The code for level 8 differs in four of the five digits from the code for adjacent level 7, while the code for 16 differs in all five digits from the code for adjacent level 15.

*Table III*

| No. | Digits | | | | |
|---|---|---|---|---|---|
| | #1 | #2 | #3 | #4 | #5 |
| 7 | 1 | 1 | 1 | 0 | 0 |
| 8 | 0 | 0 | 0 | 1 | 0 |
| 15 | 1 | 1 | 1 | 1 | 0 |
| 16 | 0 | 0 | 0 | 0 | 1 |

Because of the wide discrepancy between digits in adjacent levels of the binary binomial code, it is essential that some sort of quantizing circuit be included in the code so that data samples lying between two code values or numbers are adjusted at the instant of coding to the nearest integral code value. As previously stated, the need for quantizing increases the complexity of the coder and a suitable quantizing means is often difficult to achieve.

With a binomial cyclical coder, on the other hand, it is possible to select a data sample which lies anywhere between two adjacent code levels without causing an error of more than a single code level. For example, if a data sample for level 15.5 is supplied to the coder of the invention, any erratic selection of the single-changing digit can result only in selecting either the next higher (16) or the next lower (15) code level.

The counter stages may be read by the coincidence gates without stopping the counters and several voltages may be coded from the same coding device by using multiple variable delay circuits triggered by individual information samples for deriving a plurality of reading or gating pulses. By applying these reading or gating pulses to additional sets of coincidence gates, various code notations may be read out during a single coding cycle.

What is claimed is:

1. A device for deriving an $n$-digit binary cyclical code characterized in that successive numbers of said code differ in but one code digit comprising means for deriving a plurality of successively occurring fixed interval impulses, a counter chain response to said impulses and including $n$ serially connected bistable devices each having two input circuits and two output circuits for deriving a binary binomial code of $n$ digits, and an array of bistable devices each connected to one of said output circuits of a corresponding device of said counter chain for deriving an output representing a given digit of said binary cyclical code.

2. A system for counting pulses and converting said count into a binary cyclical code of a given number of digits characterized in that successive numbers of said code differ in but one code digit comprising a counting pulse generator for producing a train of fixed interval impulses, a counter chain including a plurality of bistable counter stages corresponding respectively to each of the digits in said code, said counter chain responsive to said impulses for producing an arrangement of pulses which changes in correspondence with the number of said impulses received, an array of bistable devices receptive of pulses from a corresponding one of said bistable counter stages except said last stage, means for deriving output pulses from each of said bistable devices of said array which correspond to a given digit of said cyclical code and means for deriving pulses from said last stage of said counter chain which corresponds to the final digit of said cyclical code.

3. A device for converting information in the form of an input signal whose amplitude corresponds to a given member into an $n$-digit binary cyclical code characterized in that successive numbers of said code differ in but one code digit comprising means responsive to a keying pulse for deriving a plurality of fixed interval impulses, a counter chain responsive to said impulses and including $n$ serially connected bistable devices for deriving an arrangement of pulses dependent upon the number of said impulses received, an array of $n-1$ bistable devices similar to those of said counter chain and each receptive of signals from a corresponding device of said counter chain for deriving an output representing a given order of said binary cyclical code, means triggered by said keying pulse and receptive of said input signal for obtaining a wave form whose delay with respect to said keying pulse is a function of the amplitude of said input signal, a multiplicity of $n$ gating means corresponding to each of said $n$ digits, the $n$th gating means responsive to said output from the $n$th bistable device of said counter chain and the remaining gating means responsive to said output form corresponding ones of said bistable devices in said array, said gating means opened in response to said wave form for obtaining therefrom an arrangement of output pulses representative of the $n$ digits of said cyclical code corresponding to said given number.

4. A device for converting information in the form of an input signal whose amplitude corresponds to a given number into an $n$-digit binary cyclical code characterized in that successive numbers of said code differ in but one code digit comprising means responsive to a keying pulse for deriving a plurality of fixed interval impulses, a counter chain responsive to said impulses and including $n$ serially connected bistable devices for deriving a binary binomial code of $n$ digits, an array of $n-1$ bistable devices similar to those of said counter chain and each receptive of signals from a corresponding device of said counter chain for deriving an output representing a given digit of said binary cyclical code, means triggered by said keying pulse and receptive of said input signal for obtaining a wave form whose delay with respect to said keying pulse is a function of the amplitude of said input signal, a multiplicity of $n$ gating means corresponding to each of said $n$ digits, the $n$th gating means responsive to said output from the $n$th bistable device of said counter chain and the remaining gating means responsive to said output from corresponding ones of said bistable devices in said array, said gating means opened in response to said wave form for obtaining therefrom an arrangement of output pulses representative of the $n$ digits of said cyclical code corresponding to said given number.

5. A system for counting pulses and converting said count into an $n$-digit binary cyclical code characterized in that successive numbers of said code differ in but one code digit comprising a counting generator for producing a train of fixed interval impulses, a counter chain including a plurality of bistable counter stages corresponding respectively to each of the digits in said code, said counter chain responsive to said impulses for producing an arrangement of pulses which changes in correspondence with the number of said impulses received, an array of bistable devices receptive of pulses from a corresponding one of said bistable counter stages except said last stage, a plurality of gating means corresponding to each of the digits in said binary cyclical code, each of said gating means except the last being supplied with available energy from corresponding ones of said bistable devices of said array, said last gating means being supplied with available energy from said final stage of said counter chain, a timing generator whose operation is synchronized with that of said counting generator, means including said timing generator for selectively deriving a gating impulse at any desired time, said gating means being responsive to the coincidence of said gating impulse and said energy for reading out said binary cyclical code.

6. A device for deriving an $n$-digit binary cyclical code characterized in that successive numbers of said code differ in but a single digit comprising a source of fixed interval impulses corresponding respectively to successive decimal numbers, a counter chain including a plurality of serially connected bistable stages each having a first and second condition of stability, each of said stages including a first portion and a second portion, said first portion being productive of an output pulse of a predetermined character only when said stage is in said first condition, said second portion being productive of an output pulse of said predetermined character only when said stage is in said second condition, means for supplying said input impulses to both portions of said first bistable stage of said counter chain, means for supplying said output impulses from said first portion of each stage of said counter stage to both portions of said succeeding stage of said counter chain, an array of bistable stages each having the same properties as those stages of said counter chain, means for applying available output impulses of said predetermined character from the second portion of all stages except said last stage of said counter chain to both portions of corresponding ones of said bistable stages of said array, means for obtaining from said first portions of said stages of said array an arrangement of output pulses representative of the first $n-1$ digits of said binary cyclical code, and means for deriving from said first portion of said final stage of said counter chain an output pulse representative of the $n$th digit of said cyclical code.

7. A device for deriving an $n$-digit binary cyclical code characterized in that successive numbers of said code differ in but a single digit comprising a source of fixed interval impulses corresponding respectively to successive decimal numbers, a counter chain including a plurality of serially connected bistable stages each having a first and second condition of stability, each of said stages including a first portion and a second portion, said first portion being productive of an output pulse of a predetermined character only when said stage is in said first condition, said second portion being productive of an output pulse of said predetermined character only when said stage is in said second condition, means for supplying said input impulses to both portions of said first bistable stage of said counter chain, means for supplying said output impulses from said first portion of each stage of said counter stage to both portions of said succeeding stage of said counter chain, an array of bistable stages each having the same properties as those stages of said counter chain, means for applying available output impulses of said predetermined character from the second portion of all stages except said last stage of said counter chain to both portions of corresponding ones of said bistable stages of said array, means for obtaining from said first portions of said stages of said array an arrangement of output pulses representative of the first $n-1$ digits of said binary cyclical code, means for deriving from said first portion of said final stage of said counter chain an output pulse representative of the $n$th digit of said cyclical code, and means synchronized with the occurrence of a fixed interval input impulse corresponding to a given number for deriving a particular pattern of output pulses representing the binary cyclical code for said given number.

8. A device for deriving an $n$-digit binary cyclical code characterized in that successive numbers of said code differ in but one code digit comprising means receptive of a keying pulse for deriving a plurality of successively occurring fixed interval pulses, means triggered by said keying pulse and receptive of an input signal whose amplitude is representative of a code number to be selected for obtaining a waveform whose delay relative to said keying pulse is representative of said code number, a counter-chain responsive to said impulses and including $n$ serially connected bistable devices for deriving a first arrangement of pulses which changes in correspondence with the number of said impulses received, an array of bistable devices each receptive of pulses from one of the devices of said counter chain for obtaining a second arrangement of pulses, and an array of $n$ gating means each receptive of pulses from one of said bistable devices and each opened by said waveform for deriving an output representing a given digit of said binary cyclical code.

References Cited in the file of this patent

UNITED STATES PATENTS

| | | |
|---|---|---|
| 2,632,058 | Gray | Mar. 17, 1953 |
| 2,660,618 | Aigrain | Nov. 24, 1953 |
| 2,685,054 | Brenner | July 27, 1954 |
| 2,714,204 | Lippel et al. | July 26, 1955 |

FOREIGN PATENTS

| | | |
|---|---|---|
| 713,347 | Great Britain | Aug. 11, 1954 |